United States Patent
Brusilovsky et al.

(10) Patent No.: US 6,782,004 B1
(45) Date of Patent: Aug. 24, 2004

(54) INTELLIGENT NETWORK SIGNALING USING AN OPEN SYSTEM PROTOCOL

(75) Inventors: Alec Brusilovsky, Naperville, IL (US); Samar Basu, Somerset, NJ (US); Janusz Dobrowolski, Wheaton, IL (US); Eric Christopher Lawson, Bolingbrook, IL (US); Michael A. McGrew, Columbus, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/196,629

(22) Filed: Nov. 9, 1998

(51) Int. Cl.[7] .................................................. H04J 3/22
(52) U.S. Cl. ........................................ 370/467; 370/353
(58) Field of Search ................................. 370/401, 353, 370/467, 469, 402, 354, 352, 465, 466, 386, 387, 388, 400, 477

(56) References Cited

U.S. PATENT DOCUMENTS

| | | | | |
|---|---|---|---|---|
| 5,793,771 A | * | 8/1998 | Darland et al. ............. | 370/467 |
| 5,802,146 A | * | 9/1998 | Dulman ........................ | 379/34 |
| 5,917,900 A | * | 6/1999 | Allison et al. ............... | 379/220 |
| 5,940,598 A | * | 8/1999 | Strauss et al. ............... | 370/352 |
| 5,966,431 A | * | 10/1999 | Reiman et al. ........ | 379/115.01 |
| 6,011,803 A | * | 1/2000 | Bicknell et al. ............. | 370/469 |
| 6,021,126 A | * | 2/2000 | White et al. ................. | 370/401 |
| 6,078,582 A | * | 6/2000 | Curry et al. ................. | 370/356 |
| 6,154,445 A | * | 11/2000 | Farris et al. ................. | 370/401 |
| 6,208,657 B1 | * | 3/2001 | Dendi et al. ................. | 370/401 |
| 6,215,783 B1 | * | 4/2001 | Neyman ..................... | 370/353 |
| 6,317,428 B1 | * | 11/2001 | Mercouroff et al. ........ | 370/360 |

* cited by examiner

*Primary Examiner*—Dang Ton
*Assistant Examiner*—Phuc Tran

(57) ABSTRACT

A communication system utilizes an open system network protocol, such as the Transmission Control Protocol/Internet Protocol (TCP/IP), to transport Intelligent Network signaling messages from an SS7 network to a service provider which is not directly linked to the SS7 network. A gateway/bridge is provided between the SS7 network and a network which operates in accordance with an Internet protocol to transform Internet protocol messages, such as TCP/IP format messages, into SS7 format, and vice versa. In this way, an Internet protocol network may be used to transport Intelligent Network signaling messages between an SS7 network and a non-SS7 network service provider.

25 Claims, 7 Drawing Sheets

INTELLIGENT NETWORK SIGNALING USING AN OPEN SYSTEM PROTOCOL

BACKGROUND OF THE INVENTION

1. Field of the Invention

The present invention relates to an apparatus and a method for transporting Intelligent Network signaling messages using an open system protocol, such as the Transmission Control Protocol/Internet Protocol.

2. Description of Prior Art

The emergence of Intelligent Network (IN) technology has resulted in an increasing number of centralized communication services (IN services) such as portable phone numbers, freephone (i.e., #800 Service), televoting, and credit-card calling. Generally, a network operator creates an IN by providing a centralized on-line database to an existing telecommunications network. By providing supplementary service information in centralized databases, instead of at local exchanges, new services may be rapidly offered to all network subscribers, not just to those subscribers connected to certain local exchanges.

Using #800 Service as an example, when a user calls an 800 number previously assigned to a business, the user's local exchange routes the call to a special network node, called a Service Switching Point (SSP). The SSP accesses an intelligence layer provided in the network, which includes a database for translating the 800 number received from the SSP into an actual destination number. The SSP receives the destination number from the network intelligence layer, and then proceeds to establish the call connection between the user and the business. The call is then charged to the business having the 800 number.

To provide IN services, network nodes, such as SSPs and intelligence layer databases, must exchange control information for setting-up, monitoring, and disconnecting a communication path (i.e., "circuit-related" information), and also exchange other information related to IN services (i.e., "non-circuit related" information). Such circuit and non-circuit related information, known as "signaling," is transmitted through a common channel signaling network which is independent of the voice channel. Signaling System No. 7 (SS7) is the internationally recognized protocol governing signaling networks.

An SS7 network has two main components: signaling points, and dedicated signaling links. For an IN, signaling points include SSPs, Signal Transfer Points (STPs), and Service Control Points (SCPs). STPs route and transport signaling messages among signaling points, and thus essentially function as exchanges. As mentioned above, SSPs are special network nodes which process calls, detect requests for IN services, and communicate with the intelligence layer of the network. SCPs are part of the network intelligence layer, and contain the logic and data necessary for executing a requested IN service.

As illustrated in FIG. 1, an SS7 network includes mated pairs of STPs 12–17, SSPs 18–19, and SCPs 20–21 connected by bi-directional links (illustrated in FIG. 1 as dashed lines). By providing mated STPs, a mesh link pattern is created which offers redundancy, and thus reliability even in cases of signaling point failure.

Because each signaling link must be able to divert signaling traffic in emergency situations, and to allow for overhead, SS7 links typically carry only approximately 40% of their maximum capacity. Furthermore, SS7 links are expensive to establish because they are dedicated solely to transporting signaling messages.

Deregulation in the telecommunications field, as well as growth in both wireline and wireless markets, has allowed smaller and other non-traditional service providers to enter the telecommunications market. Some such service providers, however, do not have an established link to an existing SS7 network because of the substantial costs of such links, and therefore are unable to access information contained in SS7 network signaling points, or provide centralized IN services offered by SS7 network operators to their customers. Additionally, as the demand for IN services increases, the increased signaling traffic over SS7 links creates potential overflow problems.

SUMMARY OF THE INVENTION

The communication system according to the present invention utilizes an open system protocol, such as the Transmission Control Protocol/Internet Protocol (TCP/IP), to transport IN signaling messages between an SS7 network and a service provider. A gateway/bridge is provided between an SS7 network, which includes intelligent nodes, and an open system network, such as the Internet or a private network which operates under an Internet protocol (hereinafter referred to as "an IP network"), thereby allowing service providers to receive and send IN signaling messages via an IP network. By encapsulating SS7 signaling messages into a format suitable for transport via an IP network, communicating via the IP network may serve as an alternative to establishing dedicated SS7 links between a service provider and an SS7 network. Furthermore, for service providers who have an established link to an SS7 network, the gateway/bridge provides a secondary transport mechanism for IN signaling messages.

DETAILED DESCRIPTION OF THE PREFERRED EMBODIMENTS

Figure 1:
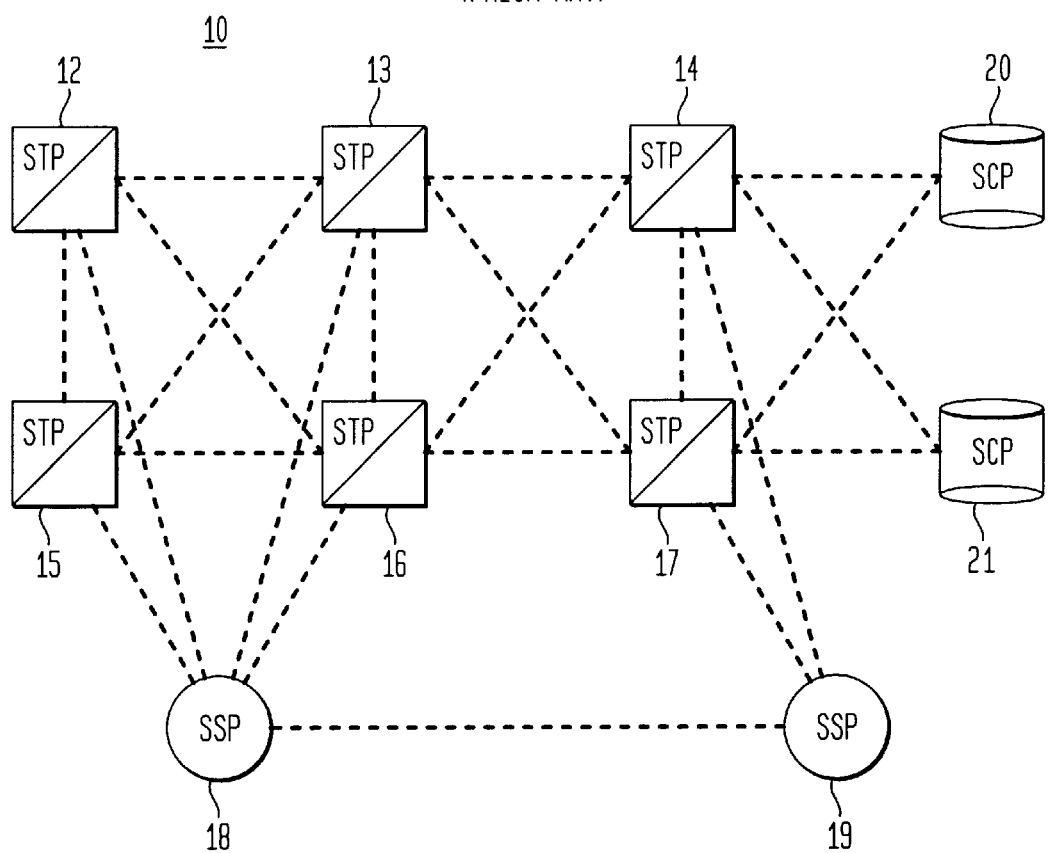
FIG. 1 illustrates a prior art signaling network in accordance with SS7.
Figure 2:
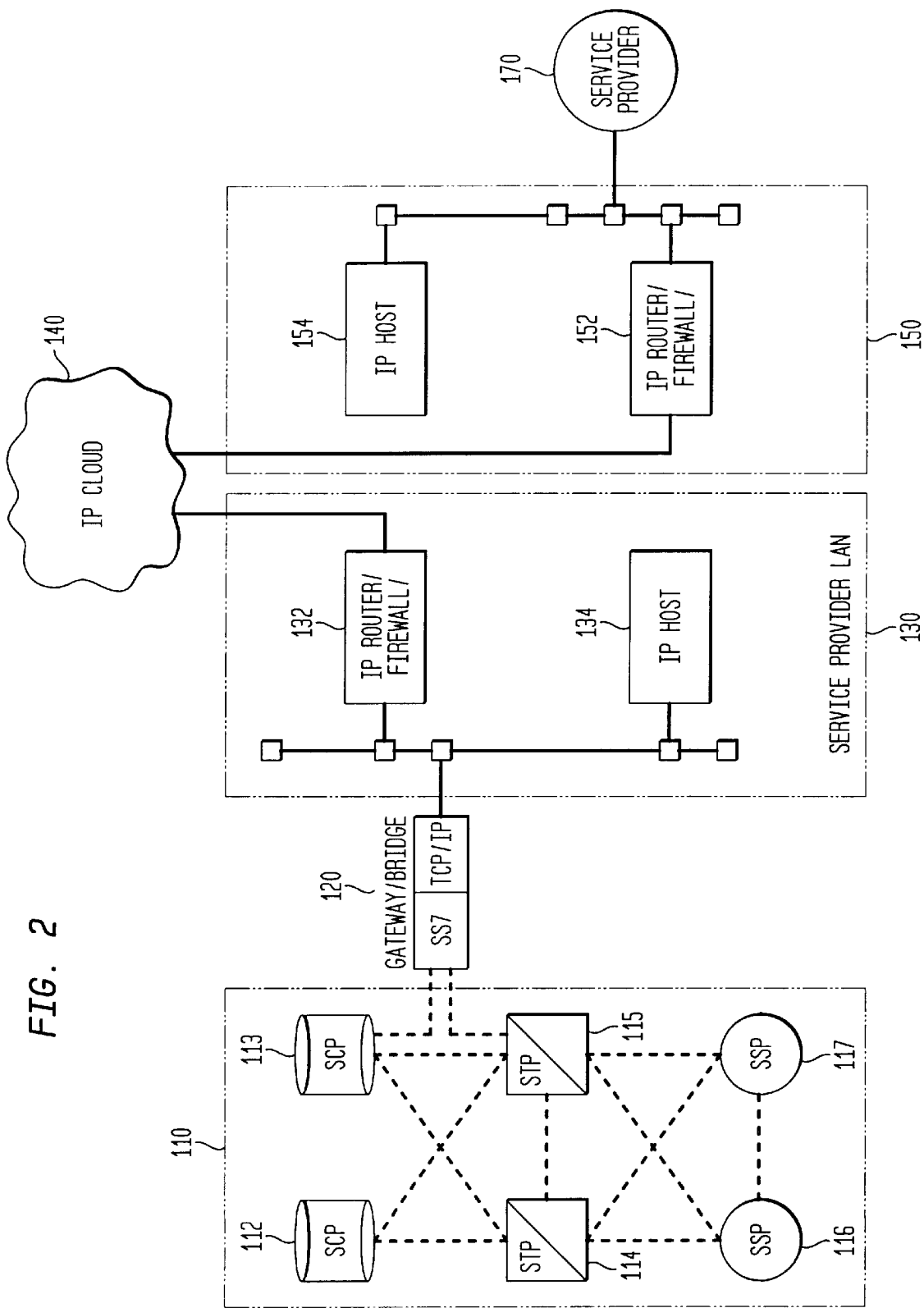
FIG. 2 illustrates an SS7 network-IP network connectivity configuration according to the present invention.

The following detailed description relates to a communication system which enables IN signaling message transport via an open system network, such as an IP network. Since TCP/IP is the predominant IP network protocol, the following description assumes the use of TCP/IP. It should be recognized, however, that the configuration illustrated in FIG. 2 is applicable to other IP network protocols as well. Furthermore, although the following discussion specifies an SS7 network as the source of IN signaling messages, it should be realized that the present invention is also applicable to signaling networks which are considered variants and predecessors of SS7, such as Common Channel Signaling System No. 6.

SS7 Network-IP Network Connectivity

FIG. 2 illustrates a configuration for SS7 network-IP network connectivity according to the present invention. As shown in FIG. 2, an SS7 network 110 includes a plurality of SCPs 112, 113; STPs 114, 115; and SSPs 116, 117. As discussed above, such SS7 network signaling points are connected via dedicated SS7 links which are shown in FIG. 2 as dashed lines.

To enable a Service Provider 170 to retrieve signaling information from the SS7 network 110 via an IP network, which is represented in FIG. 2 as the IP Cloud 140, the SS7 network 110 must be connected to the IP Cloud 140. As is well known, a network may access an IP network a number of ways, for example through another network or through a permanent connection. In FIG. 2, the SS7 network 110 is connected to the IP Cloud 140 through a first Service Provider Local Area Network (LAN) 130 which includes an IP Host 134 and an IP Router/Firewall 132. Similarly, the Service Provider 170, which in the configuration of FIG. 2 does not have a direct link to the SS7 network 110, accesses the IP Cloud 140 through a second Service Provider LAN 150 which includes an IP Host 154 and an IP Router/Firewall 152.

A gateway/bridge 120 is provided between the SS7 network 110 and the first Service Provider LAN 130. More specifically, bi-directional SS7 links connect the gateway bridge 120 to the SCP 113 and the STP 115 of the SS7 network 110. An IP link connects the gateway/bridge 120 to the first Service Provider LAN 130.

To enable IN message transport via the IP Cloud 140, the gateway/bridge 120 encapsulates SS7 network messages into a format suitable for transport via the IP Cloud 140, and also transforms messages received from the IP Cloud 140 into a format suitable for transport via the SS7 network. The following discussion details how the gateway/bridge 120 performs such an encapsulation/transformation.

Gateway/Bridge

The operation of the gateway/bridge 120 will be discussed with reference to FIGS. 3A, 3B, 4, and 5.

As is well known, network protocols are commonly represented as a structure having several functional layers, which together make up a protocol stack. In such a protocol stack, higher level functions are stacked onto lower level ones. To facilitate world-wide communication among networks having different characteristics and standards, the International Standards Organization (ISO) developed the Opens Systems Interconnection (OSI) model which represents various communication functions as a seven layered stack. Specifically, the OSI model defines the following layers in order from low to high level functionality: the Physical layer (layer 1); the Data Link layer (layer 2); the Network layer (layer 3); the Transport layer (layer 4); the Session layer (layer 5); the Presentation layer (layer 6); and the Application layer (layer 7). Of course, not all network protocols require functionality which corresponds to all seven layers of the OSI reference model.

Figure 3A:
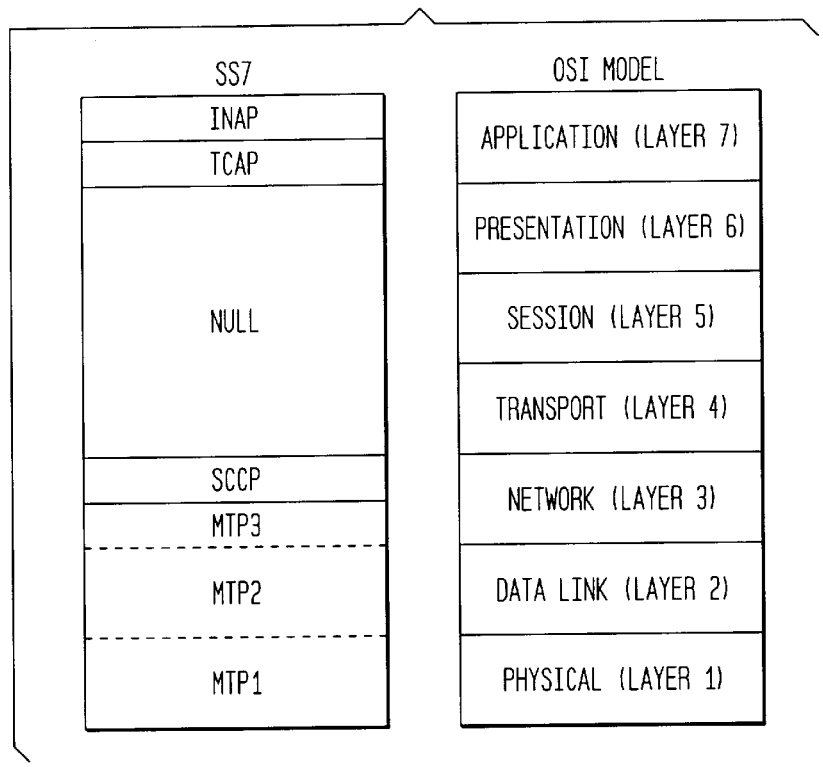
FIG. 3A illustrates the correspondence between SS7 and the Open Systems Interconnection model.

FIG. 3A illustrates the basic correspondence between the functional layers of the SS7 protocol and the OSI reference model. In the SS7 protocol stack, the first three layers (Physical, Data Link, and Network) are collectively referred to as the Network Service Part (NSP), and are realized by a combination of standards known as the Message Transfer Part (MTP) and the Signaling Connection Control Part (SCCP). The MTP standard is subdivided into three levels—MTP level 1 (MTP1), MTP level 2 (MTP2), and MTP level 3 (MTP3). As seen in FIG. 3, MTP1 and MTP2 respectively correspond to layers 1 and 2 of the OSI model. The SS7 layer corresponding to OSI model layer 3 is realized by a combination of MTP3 and SCCP. Functions corresponding to OSI model layers 4–6 are transparent to the SS7 protocol.

The Application layer (layer 7) of the SS7 protocol stack generally corresponds to a standard known as the Transaction Capabilities Application Part (TCAP), which enables the exchange of IN signaling messages between IN signaling points using TCAP formatted queries and responses. The Application layer of the SS7 protocol stack, however, may also utilize a standard known as the Intelligent Network Application Part (INAP), which is a specific protocol format for certain IN services.

Figure 3B:
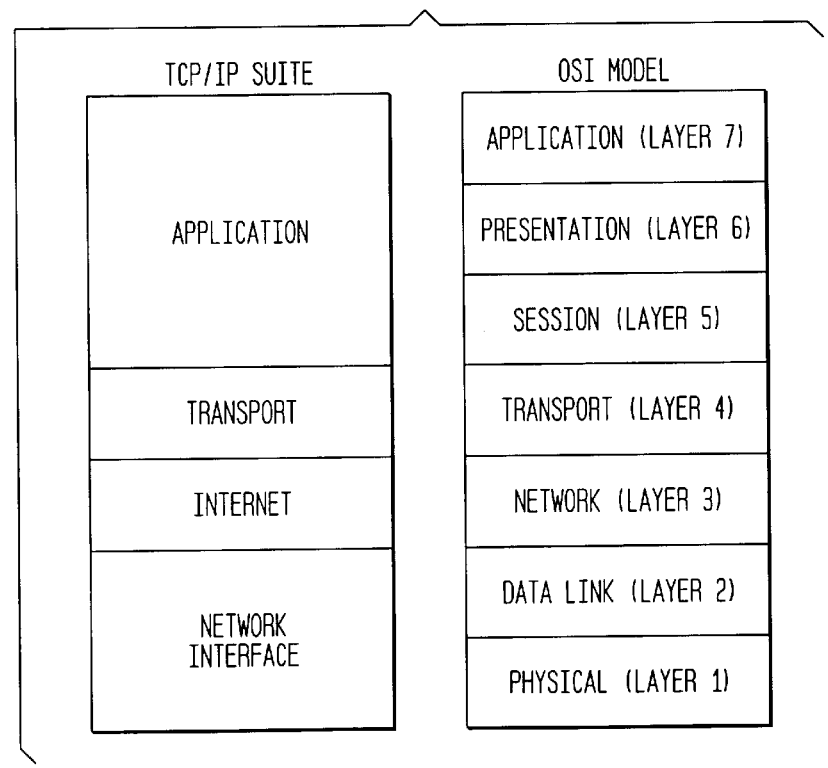
FIG. 3B illustrates the correspondence between TCP/IP and the Open Systems Interconnection model.

Regarding TCP/IP, instead of connoting a single protocol, TCP/IP is more accurately a set, or suite, of protocols which can be represented as a four layer conceptual model. As illustrated in FIG. 3B, these four layers include in order from low to high level functionality: a Network Interface layer; an Internet layer; a Transport layer; and an Application layer. As further illustrated in FIG. 3B, each layer in the TCP/IP model corresponds to one or more layers of the OSI model as follows: the Network Interface layer corresponds to OSI model layers 1 and 2; the Internet layer corresponds to OSI model layer 3; the Transport layer corresponds to OSI model layer 4; and the Application layer corresponds to OSI model layers 5–7.

Since an IP network may be an interconnected network of separately managed networks and sub-networks each having their own low-level characteristics and standards, Physical and Data Link standards are generally not part of TCP/IP. Therefore, existing Physical standards, such as RS 232 and IEEE 802 LAN, and existing Data Link standards are acceptable under TCP/IP.

A standard known simply as the Internet Protocol (IP) corresponds to the Internet layer of the TCP/IP model (the Network layer of the OSI model), and standardizes the functions of fragmenting, reassembling, and routing of Internet datagrams. Although IP provides a checksum feature which confirms an IP header's identity, higher-level protocols, such as TCP described below, are required to ensure the integrity of the data contained within the IP packet.

TCP most commonly serves as the Transport layer protocol under TCP/IP. TCP provides a connection-oriented packet delivery mechanism which ensures reliable data packet delivery and proper data packet sequencing, and also provides a checksum operation which validates data accuracy. TCP also provides redelivery of corrupted packets.

Due to their reliability, TCP connections are generally utilized to provide Transport layer functionality. When reliability is not a significant concern, however, another Transport layer protocol, namely the User Datagram Protocol (UDP), may be used. In contrast to TCP, UDP does not guarantee data packet delivery, or proper data packet sequencing.

Having described both the SS7 and TCP/IP protocols and the correspondence between the SS7 and TCP/IP protocols and the OSI reference model, encapsulating an SS7 signaling message in TCP/IP format and transforming a TCP/IP message to SS7 format is next described. These functions of the gateway/bridge 120 are described below for the situation where the Service Provider 170 has launched a query, in TCAP or INAP format, requesting signaling information, in the form of a TCAP or INAP response, from an intelligent node of the SS7 network 110.

Figure 4:
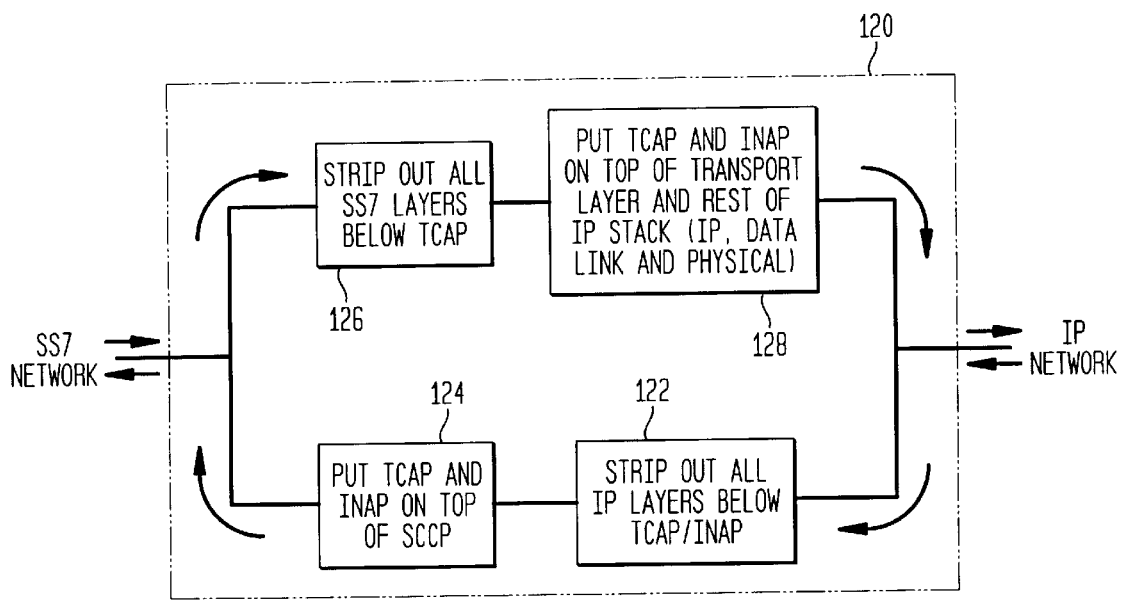
FIG. 4 is a functional block diagram illustrating the operation of the gateway/bridge in accordance with the present invention.

FIG. 4 is a functional block diagram illustrating the protocol encapsulation/transformation performed by the gateway/bridge 120. Although four discrete blocks are used to illustrate the functions performed by the gateway/bridge 120, it should be recognized that these functions may be performed by a single computer processor (e.g., a Pentium-based processor of a general purpose computer or workstation) having appropriate communication software.

In FIG. 4, arrows are provided to represent the direction of data flow between the SS7 network 110 and the IP Cloud 140. When the gateway/bridge 120 receives a TCAP/INAP query sent in TCP/IP format from the IP Cloud 140 via the first Service Provider LAN 130, the gateway/bridge 120 initially strips out all IP protocol stack layers below the TCAP/INAP layer (i.e., the Application layer of the TCP/IP stack). This function is illustrated in FIG. 4 as block 122. Next, the gateway/bridge 120 puts the remaining TCAP/INAP layer on top of the SCCP (layer 4) of the SS7 protocol stack, thereby transforming the received TCAP/INAP message into a format suitable for transport through the SS7 network. This latter function is illustrated in FIG. 4 as block 124.

Figure 5:
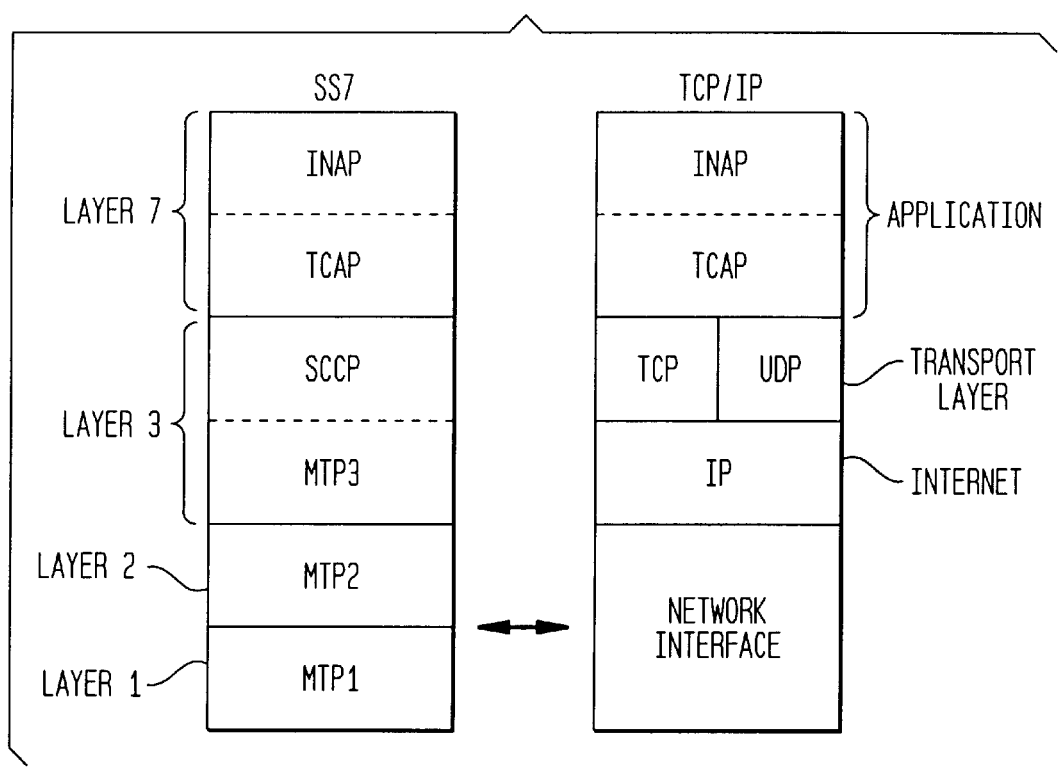
FIG. 5 illustrates an operation of mapping the SS7 protocol stack to the TCP/IP stack, and vice versa.

Alternatively, when the gateway/bridge 120 receives a TCAP/INAP response from the SS7 network 110, the gateway/bridge 120 initially strips all SS7 protocol stack layers below the TCAP/INAP layer. This function is illustrated in FIG. 4 as block 126. Next, the gateway/bridge 120 puts the remaining TCAP/INAP layer on top of the TCP/UDP (transport) layer of the IP stack, thereby encapsulating a TCAP/INAP message into a format suitable for transport via the IP Cloud 140. This latter function is illustrated in FIG. 4 as block 128. The resulting protocol stack mapping is illustrated in FIG. 5.

Computer Implementation

Figure 6:
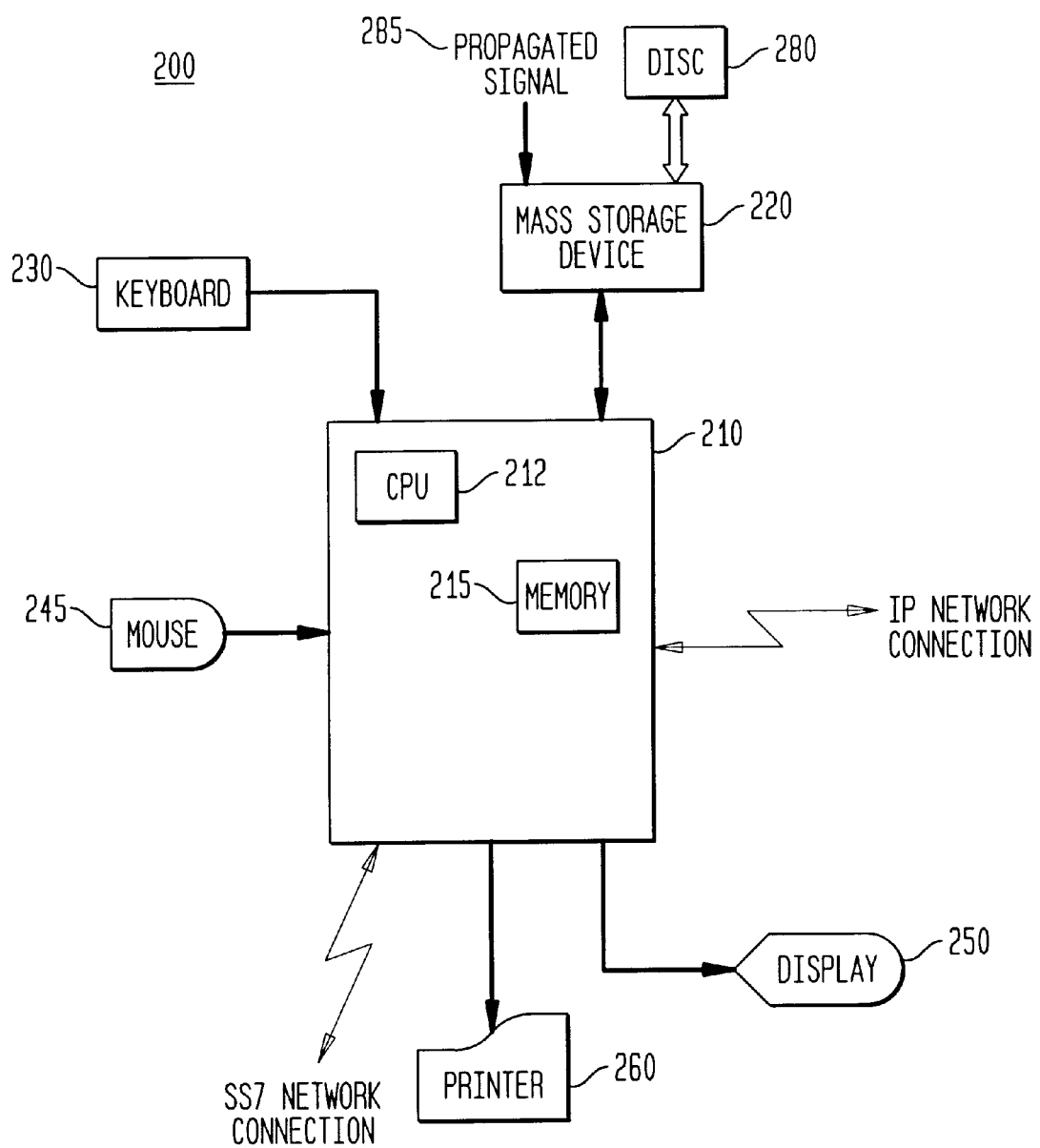
FIG. 6 is a block diagram of a computer for implementing the gateway/bridge in accordance with the present invention.

A computer system suitable for implementing the gateway/bridge 120 is shown in the simplified block diagram of FIG. 6. The computer 210 is preferably part of a computer system 200, and includes a central processing unit (CPU) 212, a memory 215, and network connections to both the SS7 network and the IP Network.

To allow user interaction with the computer 210, the computer system includes a keyboard 230 and a mouse 245. The computer system 200 also includes a display 250 such as a cathode ray tube or a flat panel display, and a printer 260.

The computer system 200 further includes a mass storage device 220 which may be, for example, a hard disk, floppy disc, optical disc, etc. The mass storage device may be used to store a computer program which enables the gateway/bridge functions discussed above to be executed when loaded in the computer 210. As an alternative, the mass storage device 220 may be a network connection or off-line storage which supplies a program to the computer. More particularly, a program embodying the method of the present invention may be loaded from the mass storage device 220 into the internal memory 215 of the computer 210. The result is that the general purpose computer 210 is transformed into a special purpose machine which implements the gateway/bridge functions of the present invention.

A computer readable medium, such as the disc 280 in FIG. 6, may be used to load computer-readable code into the mass storage device 220, which may then be transferred to the computer 210. Alternatively, the computer-readable code may be provided to the mass storage device 220 as part of an externally supplied propagation signal 285 (i.e., received over a communication line through a modem or Integrated Services Digital Network (ISDN) connection) In this way, the computer 210 may be instructed to perform the gateway/bridge operations disclosed herein.

Example Applications

It will be recognized that there are numerous instances where a service provider may utilize data from intelligent nodes of an SS7 network to offer services to their customers, and to improve existing services. The following discussion is presented merely to illustrate some examples, and is in no way an exhaustive list of the possible applications of the present invention.

First, assume that the Service Provider 170 is an Internet Service Provider (ISP) and a user attempts to log onto the ISP's network. Using the SS7 network-IP network connectivity configuration illustrated in FIG. 2, the ISP may register, verify, validate, and authenticate the user by accessing information from SS7 network databases. For example, if the user has not previously registered with the ISP, the ISP may prompt the user for personal information, such as the user's address and a credit card number, and then launch a TCAP query to verify the input information (e.g., to determine whether the credit card expired or has an exceeded credit limit, or whether the personal information entered by the user is accurate).

With reference to the network configuration illustrated in FIG. 2, the Service Provider 170 launches a TCAP query which, after transport via the IP Cloud 140, terminates at the gateway/bridge 120. The gateway/bridge 120 transforms the received TCAP query to SS7 format. Within the SS7 network 110, the message is then routed to the appropriate SCP. The SCP generates a response to the TCAP query, which is routed back to the gateway/bridge 120. The gateway/bridge 120 encapsulates the SS7 format response into TCP/IP format so that the SCP's response to the TCAP query may be sent to the Service Provider 170 via the IP Cloud 140.

Once a user has registered with the ISP, the ISP may initiate similar user prompts and TCAP queries to verify, validate, and/or authenticate the user each time the user logs onto the ISP's network.

As another example, assume that the user has successfully logged onto the ISP's network as described above, and wishes to transact with an on-line special service provider (e.g., a merchant, a bank, a public library, or a government organization). The special service provider may complete such an on-line transaction by setting up communication with, and retrieving data from, an SS7 network database. More specifically, if the user orders merchandise using a credit card, the special service provider may launch a TCAP query to an SS7 network-accessible database (i.e., an SCP established by the bank which issued the credit card) via the IP Cloud 140. The SCP subsequently generates a response which when transported back to the special service provider via the IP Cloud 140, provides information which enables the special service provider to complete the transaction (e.g., information on the user's credit limit, credit-worthiness, etc.).

In yet another instance, the special service provider may have several branches, each at a different location and/or having different hours of operation. Consequently, the special service provider may direct the user to the branch which is suitable for the user's service criteria (e.g., location) after accessing information (e.g., individual branch locations and hours of operation) from SS7 network databases via the IP Cloud 140.

Naturally, many permutations and combinations of such information exchange between SS7 network entities and an ISP or special service provider are possible in accordance with the present invention.

Alternative Configuration

Figure 7:
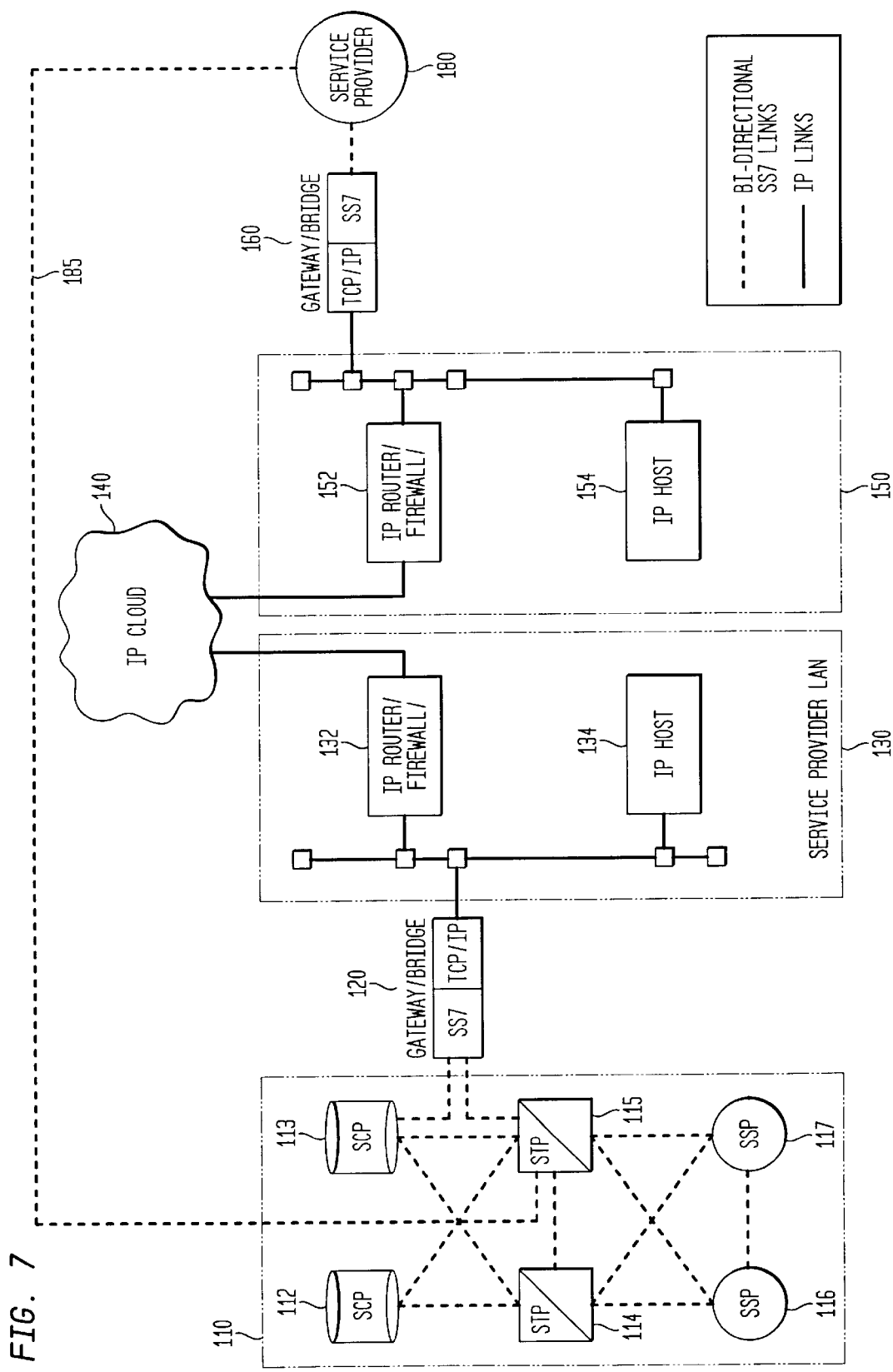
FIG. 7 illustrates an alternative SS7 network-IP network connectivity configuration in accordance with the present invention in which an IP network serves as an alternative mechanism for transporting signaling messages between an SS7 network and a service provider.

FIG. 7 illustrates an alternative embodiment according to the present invention. Since most of the elements shown in FIG. 7 have been previously discussed with reference to FIG. 2, only the differences between FIG. 2 and FIG. 7 are detailed below.

In contrast to the Service Provider 170 discussed above with reference to FIG. 2, the Service Provider 180 of the embodiment illustrated in FIG. 7 is connected to the SS7 network 110 directly through a bi-directional SS7 link 185, and thus operates in accordance with the SS7 protocol. In addition to this bi-directional SS7 link, however, the Service Provider 180 is also connected to the IP Cloud 140 via a second gateway/bridge 160, which performs the functions discussed above with reference to FIGS. 3–5. This second gateway/bridge 160 is connected to the second Service Provider LAN 150, thereby serving as an interface between the IP Cloud 140 and the Service Provider 180. The second gateway/bridge 160 transforms TCP/IP protocol messages received from IP Cloud 140 via the second Service Provider LAN 150 to the SS7 protocol.

With the alternative SS7 network-IP network connectivity configuration illustrated in FIG. 6, the IP Cloud 140 may serve as an alternative mechanism for SS7 signaling transport between the SS7 network 110 and the Service Provider 180.

The network configurations according to the present invention provide flexibility for transporting IN signaling messages, and enable a service provider to offer services using IN technology even when the service provider is not directly linked to an existing SS7 network. Therefore, information from SS7 network signaling points can be accessed by a service provider without requiring a dedicated SS7 link. The service provider may thus provide an expanded range of services to its current customers, and also attract new customers. Alternatively, by providing both an SS7 link and a TCP/IP link to the SS7 network, the TCP/IP link may be used as an alternative transport mechanism.

What is claimed is:

1. A method of providing signaling via a non-signaling protocol network, comprising:
   receiving an encapsulated signaling request from a service provider via a communication network operating in accordance with an open system protocol, said service provider being an internet service provider or a special services provider that executes transactions via the internet;
   replacing open system protocol layers of said encapsulated signaling request with signaling network protocol layers, thereby transforming said encapsulated signaling request into a signaling request of a signaling network protocol;
   outputting said transformed signaling request to a signaling protocol network;
   receiving a signaling response from a node of said signaling protocol network;
   encapsulating said signaling response into an open system protocol message; and
   sending said open system protocol message to said service provider via said communication network, said service provider performing an internet-related service based on said signaling response.

2. The method according to claim 1, wherein said node of said signaling protocol network is an Intelligent Network node.

3. The method according to claim 1, wherein said method provides an alternative path for transporting signaling messages.

4. The method according to claim 1, wherein said signaling network protocol is one of Signaling System Number 7 (SS7), a predecessor of SS7, and a variant of SS7.

5. The method according to claim 4, wherein said open system protocol is the Transmission Control Protocol/Internet Protocol (TCP/IP).

6. The method according to claim 1, wherein said special services provider sells merchandise over the internet using said signaling response.

7. The method according to claim 1, wherein
   said replacing step transforms said encapsulated signaling request by,
      stripping protocol stack layers below an application layer of said encapsulated signaling request, and
      putting said stripped signaling request on top of protocol stack layers of said signaling network protocol; and wherein
   said encapsulating step encapsulates said signaling response by,
      stripping protocol stack layers below an application layer of said signaling response, and
      putting said stripped signaling response on top of protocol stack layers corresponding to said open system protocol.

8. The method according to claim 7, wherein the application layer corresponds to a Transaction Capabilities Application Part (TCAP) format.

9. An apparatus for providing signaling via a non-signaling protocol network, comprising:
   an input for receiving an encapsulated signaling request from a service provider via a communication network operating in accordance with an open system protocol, said service provider being an internet service provider or a special services provider that executes transactions via the internet;
   an interface for replacing open system protocol layers of said encapsulated signaling request with signaling network protocol layers, thereby transforming said encapsulated signaling request into a signaling request of a signaling network protocol; and
   an output for outputting said transformed signaling request to a signaling protocol network;
   wherein said interface receives a signaling response from a node of said signaling protocol network, encapsulates said signaling response into an open system protocol message, and sends said open system protocol message to said service provider via said communication network, said service provider performing an internet-related service based on said signaling response.

10. The apparatus according to claim 9, wherein said node of said signaling protocol network is an Intelligent Network node.

11. The apparatus according to claim 9, wherein said apparatus provides an alternate path for transporting signaling messages.

12. The apparatus according to claim 9, wherein said signaling network protocol is one of Signaling System Number 7 (SS7), a predecessor of SS7, and a variant of SS7.

13. The apparatus according to claim 12, wherein said open system protocol is the Transmission Control Protocol/Internet Protocol (TCP/IP).

14. The apparatus according to claim 12, wherein said communication network is a packet-switched data network.

15. The apparatus according to claim 9, wherein said special services provider sells merchandise over the internet using said signaling response.

16. The apparatus according to claim 9, wherein
said interface transforms said encapsulated signaling request by,
stripping protocol stack layers below an application layer of said encapsulated signaling request, and
putting said stripped signaling request on top of protocol stack layers of said signaling network protocol; and wherein
said interface encapsulates said signaling response by,
stripping protocol stack layers below an application layer of said signaling response, and
putting the stripped signaling response on top of protocol stack layers corresponding to said open system protocol.

17. The apparatus according to claim 16, wherein the application layer corresponds to a Transaction Capabilities Application Part (TCAP) format.

18. A computer program embodied in a computer-readable medium for providing signaling via a non-signaling protocol network, comprising:
a computer-readable code segment for receiving an encapsulated signaling request from a service provider via a communication network operating in accordance with an open system protocol, said service provider being an internet service provider or a special services provider that executes transactions via the internet;
a computer-readable code segment for replacing open system protocol layers of said encapsulated signaling request with signaling network protocol layers, thereby transforming said encapsulated signaling request into a signaling request of a signaling network protocol;
a computer-readable code segment for outputting said transformed signaling request to a signaling protocol network;
a computer-readable code segment for receiving a signaling response from a node of said signaling protocol network;
a computer-readable code segment for encapsulating said signaling response into an open system protocol message; and
a computer-readable code segment for sending said open-network protocol message to said service provider via said communication network, said service provider performing an internet-related service based on said signaling response.

19. A computer program embodied in a computer-readable medium according to claim 18, wherein said node of said signaling protocol network is an Intelligent Network node.

20. A computer program embodied in a computer-readable medium according to claim 18, wherein said computer program provides an alternative mechanism for transporting signaling messages.

21. A computer program embodied in a computer-readable medium according to claim 18, wherein said open system protocol is the Transmission Control Protocol/Internet Protocol (TCP/IP).

22. The invention as defined in claim 18, wherein said special services provider sells merchandise over the internet using said signaling response.

23. The invention as defined in claim 18, wherein said special services provider sells merchandise over the internet using said signaling response.

24. The computer program according to claim 18, wherein
said computer-readable code segment for transforming transforms said encapsulated signaling request by,
stripping protocol stack layers below an application layer of said encapsulated signaling request, and
putting said stripped signaling message request on top of protocol stack layers of said signaling network protocol; and wherein
said computer-readable code segment for encapsulating encapsulates said signaling response by,
stripping protocol stack layers below an application layer of said signaling response, and
putting said stripped signaling response on top of protocol stack layers corresponding to said open system protocol.

25. The computer program according to claim 24, wherein the application layer corresponds to a Transaction Capabilities Application Part (TCAP) format.

* * * * *